United States Patent [19]

Schmidt et al.

[11] 4,436,259
[45] Mar. 13, 1984

[54] APPARATUS FOR THE CONTROLLED ADVANCE AND RETRACTION OF A FLEXIBLE PAY-OUT CONNECTION FIXED TO A SATELLITE BODY

[75] Inventors: Günther Schmidt, Immenstaad; Carl-Christian Etzler, Friedrichshafen, both of Fed. Rep. of Germany

[73] Assignee: Dornier System GmbH., Fed. Rep. of Germany

[21] Appl. No.: 287,805

[22] Filed: Jul. 28, 1981

[30] Foreign Application Priority Data

Oct. 9, 1980 [DE] Fed. Rep. of Germany ....... 3038095

[51] Int. Cl.³ .............................................. B64G 1/38
[52] U.S. Cl. .................................. 244/3.1; 244/158 R
[58] Field of Search ...................... 244/3.1, 3.23, 158, 244/164, 170; 102/504, 405

[56] References Cited

U.S. PATENT DOCUMENTS

| 3,229,930 | 1/1966 | Fedor et al. | 244/158 |
| 3,277,486 | 10/1966 | Kuebler | 244/170 |
| 3,715,092 | 2/1973 | Moyer et al. | 244/158 |
| 4,350,315 | 9/1982 | Pollin | 244/3.1 |

*Primary Examiner*—Charles T. Jordan
*Attorney, Agent, or Firm*—James E. Bryan

[57] ABSTRACT

This invention relates to an improvement in an apparatus for advancing or retracting a flexible pay-out connection in a controlled manner, for instance a pay-out cable fixed to a satellite body with a pay-out means mounted thereon, in particular for a spin-imparted satellite, the improvement comprising at least one groove means at the periphery of the satellite body to receive the pay-out connection, and at least one elastic holding means to hold the pay-out connection at the groove opening.

5 Claims, 7 Drawing Figures

APPARATUS FOR THE CONTROLLED ADVANCE AND RETRACTION OF A FLEXIBLE PAY-OUT CONNECTION FIXED TO A SATELLITE BODY

This invention relates to equipment for the controlled advance and retraction of a flexible pay-out connection, for instance a pay-out cable, with the pay-out means mounted thereto, in particular for spinning satellites.

It is sometimes necessary with respect to space vehicles, especially satellites, to position measuring sensors or probes at a distance from the satellite body. Known mechanisms such as articulated arms, cable pay-out means, telescoping means and the like are used for this purpose. As regards spinning satellites, cable pay-out means are rolled out for instance, which are straightened by the centrifugal forces generated by the spin. Such pay-out means and others known in practice are especially well suited for substantial extensions and preferably are unwound for rotating spools. Most of the time difficulties are encountered in this process, among which some affect the electrical connection between the rotating supply spool and the stationary housing of the pay-out means.

Another type of cable pay-out means is used to reduce the angular rotation of the satellites and is known by the expression Yo-Yo. A mass mounted to the pay-out means and hence wound around the satellite following release by a mechanism provided for that purpose is again unwound from the satellite, whereby because of the conservation of angular momentum, the spin rate of the satellite drops. At the end of the unwinding process, the pay-out means must be released and jettisoned, as otherwise it would wind again and assume the initial condition. Moreover, the repeated unwinding and winding processes result in appreciable interference in the satellite stability.

Similar apparatus is known from German Pat. No. 1,960,779, wherein a satellite with two parts supported one within the other, and rotatable with respect to each other about a spin axis, are imparted a spin; these two parts for instance are the satellite body and the antenna. A stepping motor is provided to generate a given relative speed between the two satellite parts, which is supported at the start by a de-spinning means mounted to the rotatable part. The de-spinning means counteracts the spin on account of the centrifugal force acting on masses mounted to intermediate members. The masses are fastened to flexible intermediate members, for instance cables, and wound in the direction of spin on the satellite part, with several mutually independent masses being mounted if desired in a freely movable manner.

All these apparatuses have the drawback that the pay-out means at the satellite is uncontrolled, that is, cannot be advanced by the particular required or desired lengths, but rather, as is the case for the Yo-Yo pay-out means, always the entire length of advance of the cable connecting the satellite or the masses will be called for, and moreover possibly the cables may have to be jettisoned. Also, as regards the electrical cable pay-out means between the satellite body, i.e., the electrical components mounted therein and the pay-out means itself, there are problems of electrical continuity, for instance rupture of the electrical connection in the pay-out cable.

It is therefore the object of the invention to provide a simple apparatus ensuring a controlled extension of the pay-out means at the satellite, both for small and larger distances, and moreover a reliable electrical connection.

The advantage of the invention especially is that the potential energy continuously being converted into kinetic energy when unwinding the pay-out connection from the satellite body (Yo-Yo) and which is stored (in the Yo-Yo), will be absorbed to a substantial extent by the apparatus of the invention during the winding process. Thereby the unwinding, i.e., the extension speed will be significantly reduced and within certain limits can be pre-selected or may be temporarily interrupted. The angular speed of the satellite thereby is reduced in the same manner as when the pay-out means at the Yo-Yo is actuated, only the paid-out connection extended in a controlled manner thereupon will not be rewound and therefore need not be jettisoned as is the case for the conventional Yo-Yo. Also, during the extension of the paid-out connection, the disturbances reflected on the satellite body are substantially less.

The invention will be further illustrated by reference to the accompanying drawings, in which.

Figure 1A:
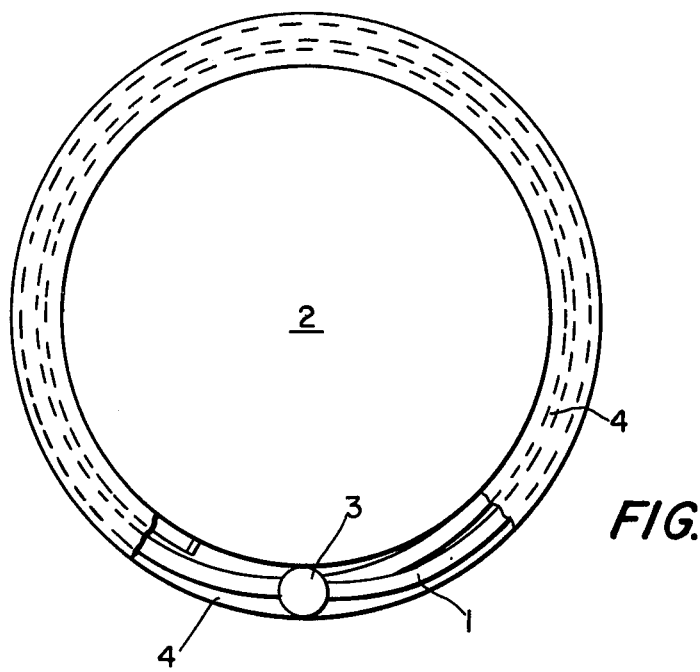
FIGS. 1a and 1b show the arrangement of a pay-out cable on a satellite body.
Figure 1B:
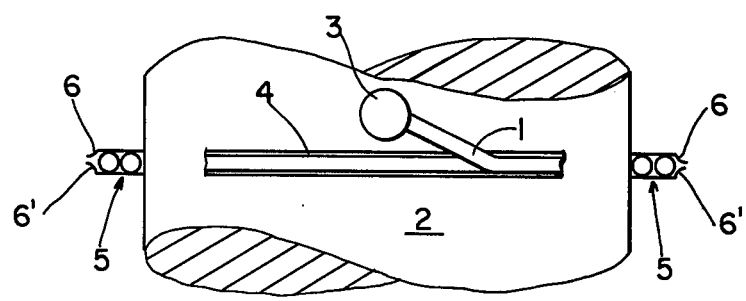

FIGS. 1a and 1b show the basic arrangement of a pay-out cable 1 on, i.e., around, a satellite body 2. FIG. 1a is a top view of the satellite body 2 with the pay-out cable 1 wound around it, and a pay-out means 3. FIG. 1b is a side view. The pay-out cable 1 is wound and held, similarly to the Yo-Yo design, in a groove 4 in the satellite body 2 and by elastic holding means 5 fixed thereto, for instance two mutually opposite partly cross-sectionally shown leaf springs 6, 6'.

Figure 2A:
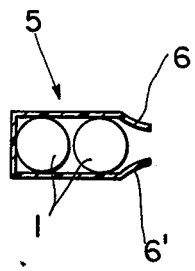
FIGS. 2a and 2b show holding means and the pay-out cable according to FIG. 1a held thereby.
Figure 2B:
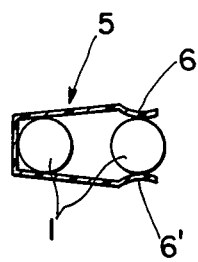

FIGS. 2a and 2b show the elastic holding means 5 with the partly cross-sectionally shown leaf springs 6, 6' and the pay-out cable 1 held thereby (FIG. 2a) and issuing therefrom while deforming them (FIG. 2b).

Figure 3:
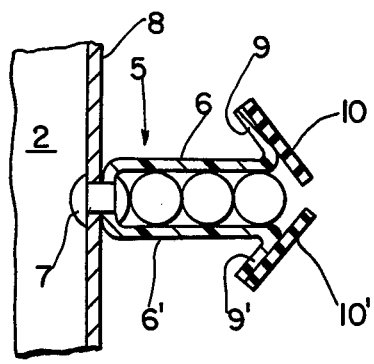
FIG. 3 is a holding means with pay-out cable and elastic lips.

FIG. 3 shows a variation of an elastic holding means 5 with the pay-out cable 1 held therein by the leaf springs 6, 6'. The holding means 5 is fixed by a rivet 7 to the wall 8 of the satellite body 2. The leaf springs 6, 6' have outwardly bent surfaces 9, 9' at the open side of the holding member, with rubber strips 10, 10', acting as exit locks, arranged in the manner of lips on the surfces 9, 9'.

Figure 4:
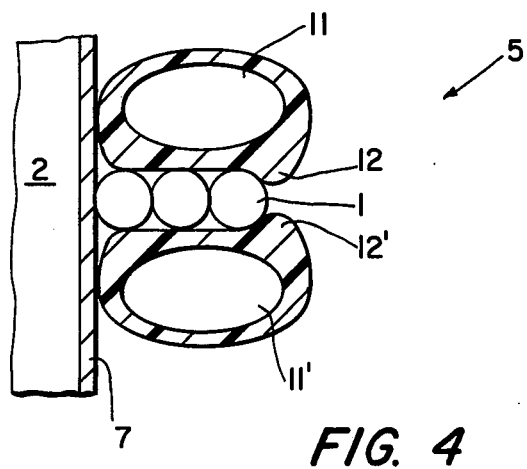
FIG. 4 is a holding means composed of two hoses and the pay-out cable held therein, and, FIG. 5 is a holding means with pay-out locking.

FIG. 4 shows a holding means 5 composed of two elastic rings or hoses 11, 11' (inflatable or solid). The two mutually opposite rings or hoses 11, 11' are shaped, i.e. provided with profiles 12, 12', to receive and keep the pay-out cable 1, and rest against the wall 7 of the satellite body 2.

Figure 5:
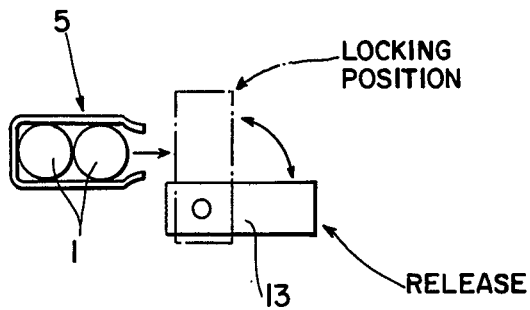

FIG. 5 shows a holding means 5 with its exit lock 13 mounted in pivotal manner at the side of the holding means. By adjusting, i.e., by pivoting the exit lock 13 in either direction (see directional arrow), the pay-out cable stored in the holding means 5 may be locked with respect to pay-out or be released.

It will be obvious to those skilled in the art that many modifications may be made within the scope of the present invention without departing from the spirit thereof, and the invention includes all such modifications.

We claim:

1. In an apparatus comprising a spin-imparted satellite body having a pay-out cable fixed thereto with a pay-out means mounted on said pay-out cable, the improvement which comprises at least one groove means at the periphery of the satellite body to receive the pay-out cable, and at least one elastic holding means to hold the pay-out cable at the groove opening.

2. Apparatus according to claim 1 in which said holding means are arranged along the groove means in an arbitrarily distributed number.

3. Apparatus according to claim 1 in which said holding means are provided with elastic lips.

4. Apparatus according to claim 1 in which said holding means are provided with an exit lock.

5. Apparatus according to claim 1 in which said holding means are composed of two mutually opposite elastic tubular components.

* * * * *